(12) United States Patent
Burke

(10) Patent No.: US 8,685,576 B1
(45) Date of Patent: Apr. 1, 2014

(54) ELECTRICALLY CONDUCTIVE POROUS MEMBRANE

(75) Inventor: Kenneth Alan Burke, Chardon, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 1213 days.

(21) Appl. No.: 11/860,661

(22) Filed: Sep. 25, 2007

(51) Int. Cl.
*H01M 8/04* (2006.01)

(52) U.S. Cl.
USPC .......................... 429/414; 429/481; 429/483

(58) Field of Classification Search
USPC .......................................... 429/414, 479–485
See application file for complete search history.

(56) References Cited

U.S. PATENT DOCUMENTS

| | | | |
|---|---|---|---|
| 4,722,773 A * | 2/1988 | Plowman et al. | ............. 205/525 |
| 5,523,175 A | 6/1996 | Beal et al. | |
| 5,989,318 A | 11/1999 | Schroll | |
| 6,083,638 A | 7/2000 | Taniguchi et al. | |
| 6,254,978 B1 | 7/2001 | Bahar et al. | |
| 6,440,594 B1 | 8/2002 | Kindler et al. | |
| 6,617,068 B2 | 9/2003 | Dufner | |
| 6,783,882 B2 | 8/2004 | Schmidt | |
| 6,884,535 B2 | 4/2005 | Saito et al. | |
| 6,942,718 B1 | 9/2005 | Schmidt | |
| 6,974,647 B2 | 12/2005 | Wilkinson et al. | |
| 2002/0192537 A1 | 12/2002 | Ren | |
| 2003/0129469 A1 | 7/2003 | Sun et al. | |
| 2003/0175569 A1 | 9/2003 | Inagaki et al. | |
| 2004/0106034 A1 * | 6/2004 | Bekkedahl et al. | ............. 429/44 |
| 2006/0024562 A1 | 2/2006 | Kashino et al. | |
| 2006/0083962 A1 | 4/2006 | Takekawa et al. | |
| 2006/0093887 A1 | 5/2006 | Nammensma et al. | |
| 2006/0105227 A1 | 5/2006 | Kim et al. | |
| 2010/0314261 A1 * | 12/2010 | Perry | ........................ 205/618 |

* cited by examiner

*Primary Examiner* — Thanhha Pham
(74) *Attorney, Agent, or Firm* — Robert H. Earp, III

(57) ABSTRACT

The present invention relates to an electrically conductive membrane that can be configured to be used in fuel cell systems to act as a hydrophilic water separator internal to the fuel cell, or as a water separator used with water vapor fed electrolysis cells, or as a water separator used with water vapor fed electrolysis cells, or as a capillary structure in a thin head pipe evaporator, or as a hydrophobic gas diffusion layer covering the fuel cell electrode surface in a fuel cell.

4 Claims, 5 Drawing Sheets

ELECTRICALLY CONDUCTIVE POROUS MEMBRANE

STATEMENT REGARDING FEDERALLY SPONSORED RESEARCH OR DEVELOPMENT

The invention described herein was made by an employee of the United States Government and may be manufactured and used by or for the Government for Government purposes without the payment of any royalties thereon or therefore.

TECHNICAL FIELD

The invention relates to membranes for fuel cells, electrolysis cells and heat pipe evaporators and, more particularly, to electrically conductive membranes with a high bubble pressure.

BACKGROUND

In the prior art, porous, internal, water separators used within a fuel cell are constructed of fine sintered metal structures or graphite structures or tight weave metal structures. One problem common to all of these types of structure is that they have a small bubble pressure which makes the control of the fuel cell difficult and unreliable. Other problems with the prior art porous, internal, water separators is that the all metal porous structures are also heavy, and the porous carbon structures have thin cross sections and are very brittle.

There is a need for a thin, lightweight, hydrophilic water separator that can be used to wick the water produced on the surface of a fuel cell electrode. The water separator must have a high bubble pressure to prevent fuel cell reactants from penetrating through the water separator. The water separator must transmit water through the water separator easily so that water does not build up on the surface of the fuel cell electrode. The water separator must also conduct electricity to the fuel cell.

There is also a need for a hydrophobic gas diffusion layer that is not based on carbon paper. The carbon within the carbon paper is susceptible to oxidation by the oxygen diffusing through the gas diffusion layer.

Another problem that existed in the prior art was the need for a thin, lightweight, hydrophilic water separator that can be used within a water vapor fed electrolysis cell to restrain the cell's water supply within a separate water compartment. Water from this compartment diffuses as a vapor to the electrolysis cell electrode surface and then is electrolyzed. The water separator must have a high bubble pressure to prevent electrolysis gas products from penetrating through the water separator. At the same time, the water separator must easily transmit water through the water separator so that the electrolysis cell does not run out of water and dry up. Also, the water separator must conduct electricity to the electrolysis cell. As with the prior art internal water separators used within fuel cells, prior art water separators used with water vapor fed electrolysis cells have used fine sintered metal structures or tight weave metal structures. These type of structures have a small bubble pressure which makes the restraint of the water difficult and unreliable. The all metal structures are also heavy.

There is also a need for a capillary structure that could be used as part of a thin, heat pipe evaporator that could in turn be used to passively cool electrochemical cells. The capillary structure must have a high bubble pressure to prevent evaporated vapor from penetrating through the capillary structure. The capillary structure must be electrically conductive to conduct electricity from one fuel cell to the next fuel cell in the cell stack. Heat pipe evaporators are not thought to have been previously used to cool electrochemical cells.

In the past, heat pipes typically use a fine sintered structure. But in order to get a sufficiently high bubble pressure, the sintered structure is so dense that it severely restricts the flow of liquid through the sintered material. This reduces the evaporator's effectiveness and its reliability.

SUMMARY OF THE INVENTION

The technology of the present invention is an electrically conductive membrane that can be configured to be used in fuel cell systems to act as a hydrophilic water separator internal to the fuel cell, or as a water separator used with water vapor fed electrolysis cells, or as a capillary structure in a thin heat pipe evaporator, or as a hydrophobic gas diffusion layer covering the fuel cell electrode surface in a fuel cell.

Electrically conductive membranes are useful to assemble multiple fuel cells into a stack, to pass current from one cell to the next.

This technology is created by starting with a porous membrane. The membrane is made electrically conductive by filling the porosity of the membrane with conductive particles. The amount of conductivity can be adjusted based on the amount of porosity that is filled with the particles. If desired, the pores can be selectively filled, using a mask or some other technique to achieve a tailored membrane material. Some porosity must be maintained to allow the membrane to continue to function as a either a hydrophilic water separator in a fuel cell, a water separator in a water vapor fed electrolysis cell, a capillary structure in a thin heat pipe evaporator, or a hydrophobic gas diffusion layer in a fuel cell.

According to the present invention, there is disclosed a fuel cell comprising a membrane electrode assembly including a membrane, a hydrogen electrode and an oxygen electrode, a hydrogen compartment is disposed on one side of the hydrogen electrode and an oxygen compartment that is disposed on one side of the oxygen electrode. An electrically conductive, porous, hydrophilic membrane having a bubble pressure of about 1 Psid to about 100 Psid is disposed on one side of the oxygen compartment opposite from the oxygen electrode; and a low pressure water compartment is disposed on one side of the electrically conductive porous membrane opposite from oxygen compartment.

Also according to the present invention, the electrically conductive, porous, hydrophilic membrane is constructed from the group of materials comprising polyethersulfone, or other plastics inherently hydrophilic or modified to incorporate a hydrophilic property.

The electrically conductive, porous, hydrophilic membrane has a pore size of between about 0.05 micron and 0.5 micron. A portion of the pores of the electrically conductive, porous, hydrophilic membrane are plugged with a conductive material selected from the group comprising platinum, gold, titanium, nickel, carbon, niobium, stainless steel alloys and other electrically conductive particles.

Further according to the present invention, the electrically conductive, porous, hydrophilic membrane has a portion of the pores plugged with a conductive material to the extent that a current density of between about 0 and about 2 amps/cm$^2$. In certain embodiments, the electrically conductive, porous, hydrophilic membrane has the pores plugged homogeneously throughout the membrane. Alternatively, the electrically conductive, porous, hydrophilic membrane has the pores plugged non-homogeneously throughout the membrane.

According to the present invention, there is disclosed a fuel cell comprising a membrane electrode assembly including a membrane, a hydrogen electrode and an oxygen electrode, a hydrogen compartment is disposed on one side of the hydrogen electrode and an oxygen compartment that is disposed on one side of the oxygen electrode. An electrically conductive, porous, hydrophobic membrane gas diffusion layer disposed between the oxygen compartment and the oxygen electrode.

Also according to the present invention, the electrically conductive, porous, hydrophobic membrane is constructed from the group of materials comprising polytetrafluoroethylene, or other plastics inherently hydrophobic or modified to incorporate a hydrophobic property. The electrically conductive, porous, hydrophobic membrane has a pore size of between about 0.05 micron and 0.5 micron. A portion of the pores of the electrically conductive, porous, hydrophobic membrane are plugged with a conductive material selected from the group comprising platinum, gold, titanium, nickel, carbon, niobium, stainless steel alloys and other electrically conductive particles.

According to the present invention, there is disclosed the method of constructing an electrically conductive, porous, hydrophilic or hydrophobic membrane, comprising the steps of providing a porous, hydrophilic or hydrophobic membrane constructed from the group of materials comprising polyethersulfone or other plastics inherently hydrophilic or modified to instill a hydrophilic property, or contructed from the group of materials comprising polytetraflourethylene or other plastics inherently hydrophobic or modified to instill a hydrophobic property, the porous, hydrophilic membrane having a bubble pressure of between about 1 Psid to about 100 Psid; and plugging a portion of the pores with an electrically conductive material.

Further according to the present invention, the method of constructing a electrically conductive, porous, hydrophilic or hydrophobic membrane comprises the step of providing a porous, hydrophilic or hydrophobic membrane having a porosity of between about 0.05 microns and 0.5 microns. The method further comprises the step of plugging a portion of the pores with a conductive material selected from the group comprising platinum, gold, titanium, nickel, carbon, niobium, stainless steel alloys and other electrically conductive particles so that the membrane has a current density of between about 0 and about 2 amps/cm$^2$.

Also according to the present invention, the method comprises the steps of placing the porous, hydrophilic or hydrophobic membrane into a solution having conductive particles of a desired size and concentration; controlling the rate and direction of filtration through the membrane; masking areas on the membrane where plugging is not desired; and filtering small conductive particles through the membrane until the desired degree of plugging and the corresponding magnitude of the electrical conductivity is achieved.

Still further according to the present invention, the method of constructing a electrically conductive, porous, hydrophilic or hydrophobic membrane comprises the step of pressing fine conductive particles into the membrane.

Also according to the present invention, the method comprises the steps of coating a layer of pure metal on portions of the side of the membrane which will act as a cathode; applying a mask to the opposite side of the membrane from the coating of pure metal; placing the membrane with the coating of pure metal on one side and the mask on the other side into a plating bath of an aqueous water solution containing ions of the metal to be plated; placing an anode electrode on the membrane within the bath so that the anode electrode is on the opposite side from the coated side; and applying electrical potential between the coating of pure metal which acts as the cathode electrode and the anode electrode so that ions of the metal to be plated migrate to the cathode through the membrane to forms a spider like network of solid metal plated through the membrane.

According to the present invention, there is disclosed an electrolysis cell, comprising a membrane electrode assembly including a membrane and a hydrogen electrode and an oxygen electrode disposed on either side thereof; a hydrogen compartment is disposed on one side and adjacent the hydrogen electrode; an oxygen compartment is disposed on one side of the oxygen electrode and adjacent the oxygen electrode. An electrically conductive porous hydrophilic membrane disposed on one side of the oxygen compartment opposite from the side of the oxygen electrode; and a low pressure water compartment is disposed on one side of the electrically conductive porous separator adjacent the electrically conductive porous separator.

Also according to the present invention, there is disclosed an electrically conductive, porous, hydrophilic membrane is constructed from the group of materials comprising polyethersulfone, or other plastics inherently hydrophilic or modified to instill a hydrophilic property, the porous, hydrophilic membrane having a bubble pressure of between about 1 Psid to about 100 Psid. Also, the electrically conductive, porous, hydrophilic membrane has a portion of the pores plugged with a conductive material selected from the group comprising selected from the group comprising platinum, gold, titanium, nickel, carbon, niobium, stainless steel alloys and other electrically conductive particles to the extent that a current density of between about 0 and about 2 amps/cm$^2$.

According to the present invention, there is disclosed an electrically conductive heat pipe, comprising a hermetically sealed metal container of a metal with high thermal conductivity; a porous hydrophilic, electrically conductive capillary membrane within the metal container that provides the capillary driving force to return the condensate to the evaporator; and a liquid within the metal container that functions as the working fluid.

Also according to the present invention, the electrically conductive, porous, hydrophilic membrane of the heat pipe is constructed from the group of materials comprising polyethersulfone or other plastics inherently hydrophilic or modified in a hydrophilic property. The electrically conductive, porous, hydrophilic membrane has a portion of the pores plugged with a conductive materials, selected from the group comprising selected from the group comprising platinum, gold, titanium, nickel, carbon, niobium, stainless steel alloys and other electrically conductive particles so that the membrane has a current density of between about 0 and about 2 amps/cm$^2$.

Unless otherwise noted, or as may be evident from the context of their usage, any terms, abbreviations, acronyms or scientific symbols and notations used herein are to be given their ordinary meaning in the technical discipline to which the disclosure most nearly pertains. The following terms, abbreviations and acronyms may be used throughout the descriptions presented herein and should generally be given the following meaning unless contradicted or elaborated upon by other descriptions set forth herein. Some of the terms set forth below may be registered trademarks (®).

BRIEF DESCRIPTION OF THE DRAWINGS

Reference will be made in detail to embodiments of the disclosure, examples of which may be illustrated in the accompanying drawing figures (FIGs). The figures are intended to be illustrative, not limiting. Although the invention is generally described in the context of these embodiments, it should be understood that it is not intended to limit the invention to these particular embodiments.

Certain elements in the figures may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity. In some cases, hidden lines may be drawn as dashed lines (this is conventional), but in other cases they may be drawn as solid lines.

Figures 1, 1A:
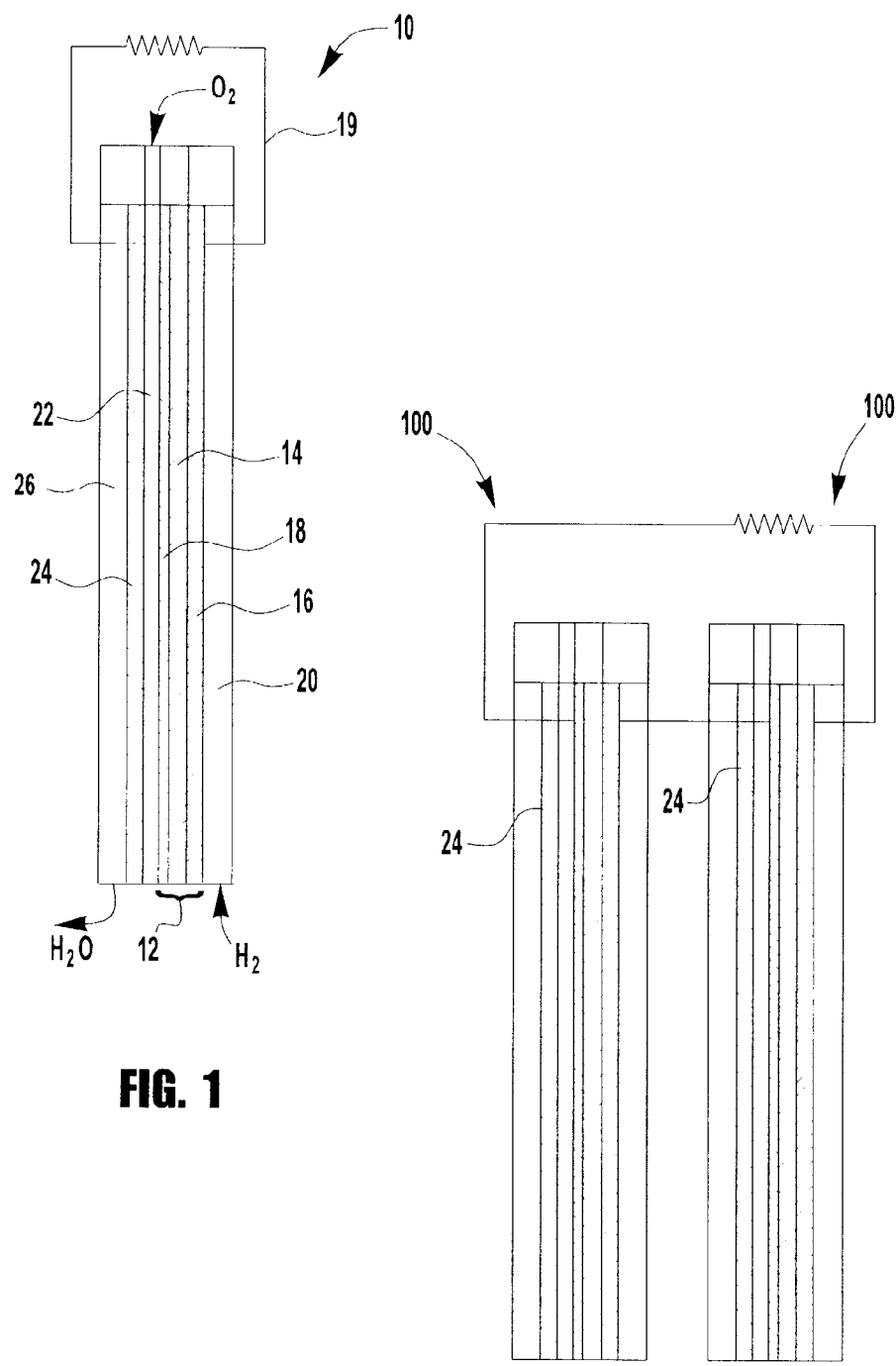

If shading or cross-hatching is used, it is intended to be of use in distinguishing one element from another (such as a cross-hatched element from a neighboring un-shaded element. It should be understood that it is not intended to limit the disclosure due to shading or cross-hatching in the drawing figures.

Figure 2:
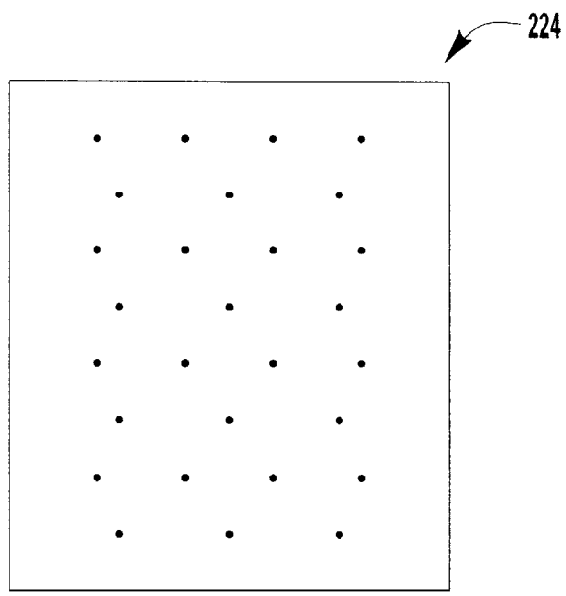

Elements of the figures may (or may not) be numbered as follows. The most significant digits (hundreds) of the reference number correspond to the figure number. For example, elements of FIG. 1 are typically numbered in the range of 100-199, and elements of FIG. 2 are typically numbered in the range of 200-299. Similar elements throughout the figures may be referred to by similar reference numerals. For example, the element 199 in FIG. 1 may be similar (and possibly identical) to the element 299 in FIG. 2. Throughout the figures, each of a plurality of elements 199 may be referred to individually as 199*a*, 199*b*, 199*c*, etc. Such relationships, if any, between similar elements in the same or different figures will become apparent throughout the specification, including, if applicable, in the claims and abstract.

FIG. 1 is a schematic illustration of a membrane-based passive water management fuel cell in accordance with the present invention;

FIG. 1A is a schematic of a plurality of membrane-based passive water management fuel cells electrically interconnected according to the present invention.

Figure 1B:
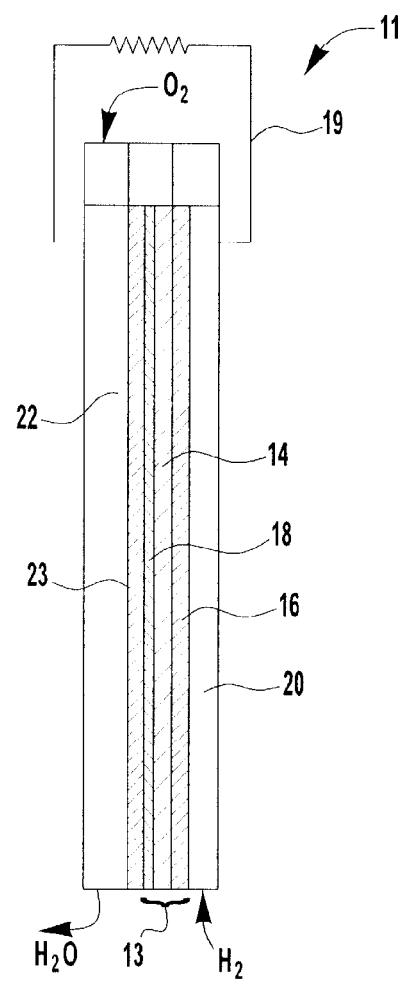
Figure 3:
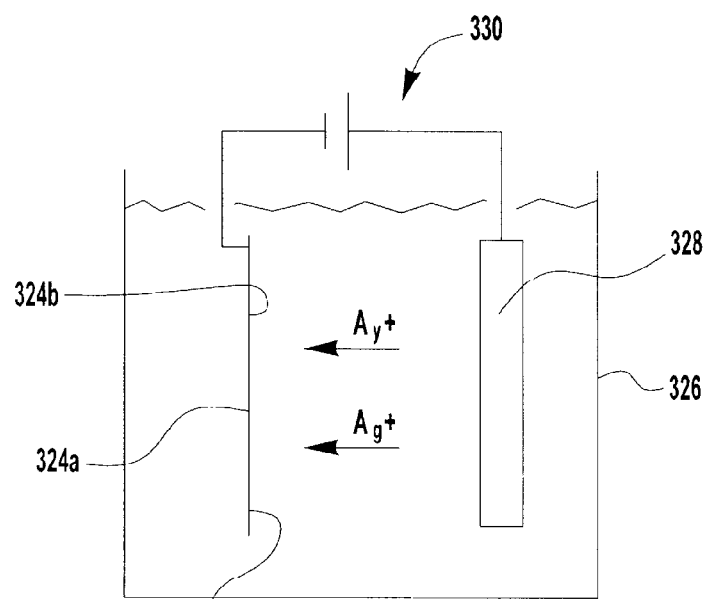
Figure 4:
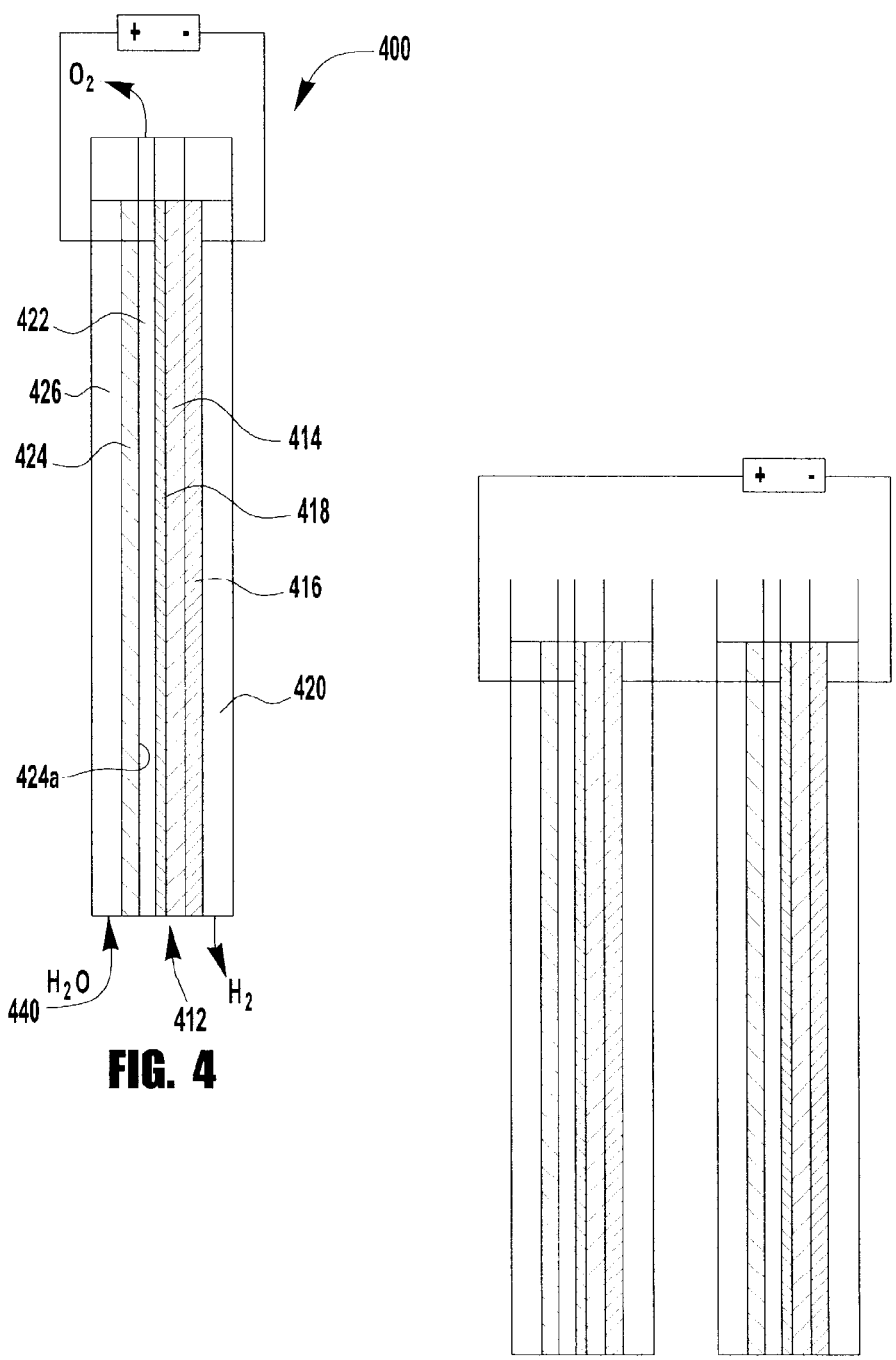
Figure 5:
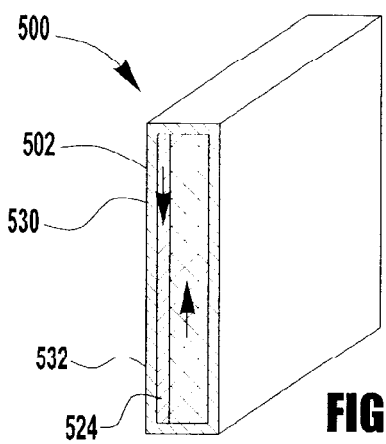
Figure 5A:
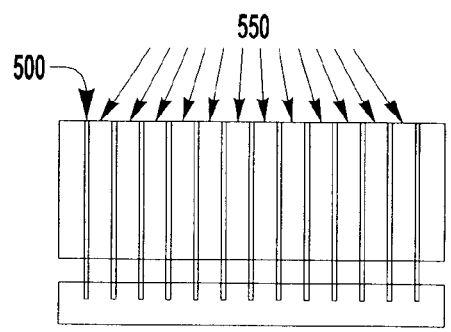
Figure 5B:
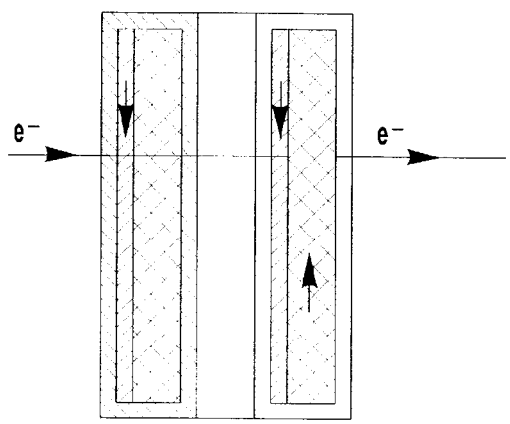

FIG. 1B is a schematic illustration of a membrane-based gas diffusion layer fuel cell in accordance with the present invention;

FIG. 2 is a schematic illustration of a membrane in accordance with the present invention;

FIG. 3 is a schematic illustration of a plating bath to form a conductive membrane in accordance with the present invention;

FIG. 4 is a schematic illustration of a membrane based electrolysis cell in accordance with the present invention;

FIG. 4A is a schematic of a plurality of membrane based electrolysis cells electrically interconnected according to the present invention;

FIG. 5 is a schematic illustration of a heat pipe with a perforated, electrically conductive membrane in accordance with the present invention;

FIG. 5A is a schematic illustration of a heat pipe with a perforated, electrically conductive membrane passively connected to a plurality of stacked fuel cells in accordance with the present invention; and FIG. 5B is a schematic illustration of a plurality of heat pipes with a perforated, electrically conductive membrane electrically connected to each other in accordance with the present invention.

DETAILED DESCRIPTION OF THE INVENTION

Throughout the descriptions set forth herein, lowercase numbers or letters may be used, instead of subscripts. For example Vg could be written $V_g$. Generally, lowercase is preferred to maintain uniform font size.) Regarding the use of subscripts (in the drawings, as well as throughout the text of this document), sometimes a character (letter or numeral) is written as a subscript—smaller, and lower than the character (typically a letter) preceding it, such as "$V_s$" (source voltage) or "$H_2O$" (water). For consistency of font size, such acronyms may be written in regular font, without subscripting, using uppercase and lowercase—for example "Vs" and "H20".

Although various features of the invention may be described in the context of a single embodiment, the features may also be provided separately or in any suitable combination. Conversely, although the invention may be described herein in the context of separate embodiments for clarity, the invention may also be implemented in a single embodiment. Furthermore, it should be understood that the invention can be carried out or practiced in various ways, and that the invention can be implemented in embodiments other than the exemplary ones described hereinbelow. The descriptions, examples, methods and materials presented in the in the description, as well as in the claims, should not be construed as limiting, but rather as illustrative.

If any dimensions are set forth herein, they should be construed in the context of providing some scale to and relationship between elements. For example, a given element may have an equal, lesser or greater dimension (such as thickness) than another element. Any dimensions or relationships that are important or critical will generally be identified as such. The term "at least" includes equal to or greater than. The term "up to" includes less than. If any ranges are set forth herein, such as 1-10 microns, sub-ranges are implied, if not expressly set forth, such as 1-5 microns, 6-10 microns, 3-8 microns, 4-6 microns, etc. Also, an open-ended range or ratio such as "at least 2:1", should be interpreted to include sub-ranges such as at least 3:1, at least 5:1, and at least 10:1.

Referring to FIG. 1, there is illustrated a membrane-based, passive water management fuel cell 10. The fuel cell 10 incorporates a membrane electrode assembly 12 including a membrane 14, such as for example a Polymer Electrolyte Membrane (PEM), a hydrogen electrode 16 and an oxygen electrode 18 on either side of the membrane. A hydrogen compartment 20 is disposed on one side of the hydrogen electrode (anode) 16 and in contact with the hydrogen electrode 16 and an oxygen compartment 22 is disposed on one side of the oxygen electrode (cathode) 18 and in contact with the oxygen compartment 22.

An electrically conductive porous membrane 24, as discussed in more detail below, is disposed on one side of the oxygen compartment 22 opposite from the oxygen electrode 18. A low pressure water compartment 26 is disposed on one side of the electrically conductive porous membrane 24 opposite from the oxygen electrode (cathode) 18.

During the fuel cell operation, hydrogen fuel $H_2$ flows into the hydrogen compartment 20 of the membrane electrode assembly 12. When the hydrogen contacts the hydrogen electrode of anode 16, a catalyst causes the hydrogen to split into positive hydrogen ions (protons) ($2H^+$) and negatively charged electrons ($2e^-$). The Polymer Electrolyte Membrane (PEM) 14 allows only the positively charged ions to pass through it to the oxygen electrode (cathode) 18. The negatively charged electrons must travel along an external circuit 19 from the anode 16 to the cathode 18, creating an electrical current (supplying power) because the membrane 14 is electrically insulating. On the cathode 18, oxygen molecules react with the electrons (which have traveled through the external circuit) and protons to form water on the oxygen electrode surface. As the water droplets on the oxygen electrode surface grow in size, the droplets touch the surface of the porous membrane 24, and are "soaked" up and enter the low pressure water compartment 26. The porous membrane 24 has a relatively high bubble pressure which prevents the gaseous oxygen in the oxygen compartment 22 from crossing the membrane 24 into the low pressure chamber 26 after the membrane has soaked up the water. Water leaves the fuel cell water compartment 26 and flows to a suitable low pressure water drain external to the fuel cell.

Referring to FIG. 1B, there is illustrated an alternative embodiment of a fuel cell 11 that incorporates a membrane electrode assembly 13 including a membrane 14, such as for example a Polymer Electrolyte Membrane (PEM), a hydrogen electrode 16 and an oxygen electrode 18 on either side of the membrane. A hydrogen compartment 20 is disposed on one side of the hydrogen electrode (anode) 16 and in contact with the hydrogen electrode 16, and a hydrophobic membrane gas diffusion layer 23 is disposed on one side of the oxygen electrode (cathode) 18 and in contact with the oxygen compartment 22. An embodiment of the present invention is directed to a technique to fabricate electrically conductive pathways through the thickness of the otherwise non-conductive porous membrane 24. The porous membrane 24 normally performs a passive water/gas separation inside the fuel cell 10. By adding an electrical conductivity property to the typically non-conductive material of membrane 24, it can now be used as a water separator and/or as a gas diffusion layer inside fuel cell 10.

As noted before, in the prior art, it is known to use conductive, porous water separators in fuel cells. However, these prior art water separators are typically of all metal construction, and are heavier than a membrane constructed of hydrophilic materials, as with the present invention. The all metal separators do not allow water to permeate as easily as an electrically conductive, porous membrane, nor do they prevent the transmission of gas bubbles through the separator as well with the electrically conductive, porous membrane of the present invention.

One embodiment of the present invention incorporates a thin, porous electrically conductive membrane 24 to passively control the water within a fuel cell. The new, improved membrane 24 of the present invention dramatically increases both the water transmission through the membrane as well as the robustness of the liquid/gas separation between the oxygen compartment 22 and the low pressure water compartment 26. One important advantage of using the passive approach of the present invention to separate the liquid water from the gases within a fuel cell is that it eliminates the need for active pumping of reactants through the fuel cells to remove the water droplets that collect on the cathode 18.

The thin, lightweight hydrophilic membrane 24 (compare membrane 224 of FIG. 2 as described herein after) of the present invention effectively wicks the water produced on the surface of the oxygen electrode 18 (see FIG. 1), into the water compartment 26. The membrane 24 has a high bubble pressure to prevent fuel cell reactants, i.e., oxygen in the oxygen compartment 22, from penetrating through the membrane. A high bubble pressure means that once the membrane is wet, it won't transmit gas very well. However, the membrane 24 easily transmits water so that water does not build up on the surface of the fuel cell electrode 18.

In accordance with the present invention, the membrane 24 can also conduct electricity between two or more fuel cells of a fuel cell stack. As shown in FIG. 1A, a plurality fuel cells 100 can be electrically interconnected through the electrically conductive, porous membranes 24 of the present invention.

As mentioned before, it has been known in the prior art to use fine sintered metal or graphite structures or tight weave metal structures for a hydrophilic water separator. The problem with these prior art structures, however, is that they have a low bubble pressure, i.e. less than about 10 PSID which makes the control of the fuel cell difficult and unreliable. Moreover, the all metal structure results in a heavy water separator. With the carbon structure, the water separator is light but very brittle in thin cross sections. It is also beneficial if the conductive membrane of the present invention can act as a gas diffusion layer. Prior art has typically used carbonized paper, carbon felt or carbon fabric that has been treated with a teflon solution to make it hydrophobic. These type of carbon structures are susceptible to chemical oxidation, and the teflon solution coating is susceptible to failing.

As shown in FIG. 2, there is a porous membrane 224 (compare 24) according to the present invention. The membrane 224 is relatively thin, lightweight, resistant to both chemical reduction and chemical oxidation, and highly electrically conductive. The porous membrane 224 can be constructed of a wide range of porous plastics. The membrane 224 is preferably between about 0.001 and 0.010 inches thick. If the membrane 224 is too thin, i.e., less than about 0.001 inches thick, it is not robust enough and can easily tear apart during manufacture. Conversely, if the membrane 224 is too thick, i.e., more than about 0.010 inches thick, it would have too high of a resistance to the passage of the water or water vapor.

The membrane 224 preferably has a pore size of between about 0.05 microns and 0.5 microns. If pore size of the membrane 224 is too large, i.e., more than about 0.5 microns it will have too low a bubble pressure. Conversely, if the pore size of the membrane 224 is too small, i.e., less than about 0.05 microns, it will not transmit water sufficiently.

According to the present invention, the porous membrane 224 is made electrically conductive by "plugging" the pores of the membrane with fine particles of electrically conductive material(s), such as for example, platinum, gold, titanium, nicrex, carbon, niobium, stainless steel and other electrically conductive particles, to the extent that a desired current density is achieved through the plane of the membrane.

The desired current density is between about 0 and about 2 amps/cm$^2$. If the current density is too high, i.e., more than about 10 amps/cm$^2$, then there could be a problem that not enough water is transmitted through the electrically conductive membrane or the electrical resistance is too high.

The desired current density can be achieved when preferably about 0.001% to about 10% of the pores of the membrane 224 will be plugged. If too large a percentage of the pores of the membrane 224 are plugged, i.e., more than about 10%, then there could be a problem that the water transmission will be adversely affected. Conversely, if too few of the pores of the membrane 224 are plugged, i.e., less than about 0.01 percent, then there could be a problem that the electrical resistance will be undesirably high.

The pores of the membrane can be plugged homogeneously throughout the membrane, yet not to the extent that all fluid flow is prevented. The plugging can also be applied non-homogeneously, completely plugging small localized areas, leaving other areas only partially plugged or not plugged at all. The magnitude of the electrical conductivity can be adjusted by the extent of the plugging and the type of conductive material(s) used to plug the membrane. The membrane material, size, thickness, porosity, pore size and other characteristics can all be adjusted independent of the material(s) used to plug the membrane.

There are multiple methods by which this plugging may be accomplished. One of these methods is to place a membrane into a solution containing small conductive particles. The solution is then filtered through the membrane until the desired degree of plugging and the corresponding magnitude of the electrical conductivity is achieved. The control of this filtering process can be done by selecting the particle size and the concentration of the particles in the solution being filtered. The control also includes adjusting the rate and direction of filtration through the membrane, and masking areas on the membrane where plugging is not desired.

Another of these methods is pressing the fine particles into the membrane. The size and volume of the particles can be selected, and the pressure used to press them into membrane can be chosen to control the magnitude of the electrical conductivity to be achieved. Here too, the areas on the membrane where plugging is not desired can be masked.

Another method of making a porous membrane 224 conductive is to immerse a membrane into a plating bath to coat the membrane, as is known. As shown in FIG. 3, portions of the porous membrane 324 (compare 224) are initially coated on one side 324a with a layer of pure metal. Then, a mask (not shown) is applied to the opposite side 324b of membrane 324 to delineate the portions of the membrane through which solid metal can be bonded through the membrane. Then the membrane 324 with the solid metal on one side 324a and the mask on the other side 324b is immersed in a container 326 with a plating bath of an aqueous water solution containing ions of the metal to be plated. The membrane 324 is conductive because of the metal coated on one side forms the cathode. An anode electrode 328 is also disposed within the bath. The membrane 324 is disposed within the bath so that the anode electrode 328 is on the opposite side from the coated side 324a, i.e. the cathode. Sufficient electrical potential is applied from source 330 between the cathode 324a and the electrode 328 so that metal ions of the metal to be plated, i.e. silver ions, migrate to the cathode 324a through the membrane 324. The metal ions, i.e. silver, moving through the membrane based on the geometrical shape of the mask is chemically bonded to the membrane and forms a spider like network of solid metal plated through the membrane.

EXAMPLE

A membrane suitable for the present invention is a polythersulfone membrane filter manufactured by the Pall Corporation. The selected membrane has is a 0.2 micron pore size and a specified a water transmission rate of 26 milliliters (ml)/minute/cm$^2$ at 10 pounds per square inch differential (psid). The bubble pressure of the membrane is 51 psid. At this water production rate the membrane could support a fuel cell or electrolysis current density of:

$$\frac{26 \text{ ml}}{\text{minute} - \text{cm2}}\left(\frac{2976 \text{ Amp-hr}}{1000 \text{ ml}}\right)\left(\frac{60 \text{ minute}}{\text{hr}}\right) = 4642.56 \frac{\text{Amp}}{\text{cm2}}$$

This current density is three orders of magnitude greater than the minimum required. The test shows that the polythersulfone membrane will provide adequate current density as well as more than the required water separation capability while providing ample water transmission capability.

As discussed before, the base material forming the membrane is not electrically conductive. It can be made conductive by plugging a fraction of the pores with an electrically conductive material. Assuming 5% of the pores were plugged with a fine nickel powder, the voltage drop through the membrane at 1 ampere per sq centimeter conductance would be:

$$\frac{0.09906 * 10 - 6\Omega - \text{cm2}}{\frac{0.05 \text{ cm2} pluggedarea}{1.0 \text{ cm2} activecellarea}}\left(\frac{1 ampere}{\text{cm2} of active cell area}\right) = 2 * 10 - 06 \text{ volts}$$

This is a voltage drop three orders of magnitude better than what would be acceptable. The conclusion is that a membrane constructed according to the principles of the present invention will provide a high conductance electrical current transmission from cell to cell.

ANOTHER EMBODIMENT

Referring to FIG. 4, there is shown an electrolysis cell 400. The electrolysis cell 400 includes a membrane electrode assembly 412 including a membrane 414, such as a proton exchange membrane, and a hydrogen electrode 416 and an oxygen electrode 418 disposed on either side thereof. A hydrogen compartment 420 is disposed on one side of the hydrogen electrode (anode) 416 adjacent the hydrogen electrode and an oxygen compartment 422 is disposed on one side of the oxygen electrode (cathode) 418 adjacent the oxygen electrode.

An electrically conductive porous membrane or separator 424 (compare 24, 224, 324) is disposed on one side of the oxygen compartment 422 opposite from the side of the oxygen electrode 418. A low pressure water compartment 426 is disposed on one side of the electrically conductive porous separator 424 opposite from the oxygen electrode 418. The electrolysis cell 400 of the present invention passively controls the water within the electrolysis cell by the use of the thin, porous electrically conductive membrane or separator 424. The separator 424 dramatically improves both the water transmission through the separator and also dramatically improves the robustness of the liquid/gas separation within the electrolysis cell. One advantage of this passive approach to separate the liquid water from the gases within an electrolysis cell is that it eliminates the need for active pumping of water through the electrolysis cell 400.

The conductive, hydrophilic filter membrane 424 is incorporated into the water vapor fed electrolysis cell 400 as shown in FIG. 4. The water on the liquid side of the membrane 424, i.e. in low pressure water compartment 426, is kept at lower pressure than the gas in the oxygen compartment 422 on the gas side of the membrane. Since the membrane 424 is porous and hydrophilic, water penetrates into the interior of the membrane and effectively blocks the transmission of oxygen gas through the porous membrane. That is, the high bubble pressure of membrane 424 prevents any bulk gas penetration through the membrane, thus creating an effective gas/liquid separation.

During the electrolysis cell process, water is consumed on the surface of the oxygen electrode 418. As the water is consumed, water evaporates from the surface 424a of the electrically conductive porous separator 424. Liquid water is restrained within the low pressure water compartment 426 by the higher pressure on the gas side of the porous separator 424. Water drawn from the water compartment 426 is replaced by water from a suitable low pressure water source 440 external to the electrolysis cell.

As shown in FIG. 4a, a series of electrolysis cells 400 can be interconnected in series through the electrically conductive, porous membranes 424 of the present invention.

ANOTHER EMBODIMENT

Referring to FIG. 5, there is illustrated a membrane based, heat pipe 500 whose purpose is to quickly transfer heat from one point to another with almost no heat loss. Heat pipe 500 consists of a hermetically sealed metal container 502 of a metal with high thermal conductivity such as titanium or copper. Within the metal container 502 is a capillary structure or membrane 524 (compare 224,424) of a capillary wicking material. The essence of the heat pipe is its ability to transport heat against gravity by an evaporation-condensation cycle with the help of the porous capillaries within the membrane that form the capillary structure. The wicking quality of membrane 524 provides the capillary driving force to return the condensate to the evaporator. Within the metal container 502 is a liquid, preferably water that functions as the working fluid.

The container 502 functions to isolate the working fluid from the outside environment. It has to therefore be leakproof, maintain the pressure differential across its walls, and enable transfer of heat to take place from and into the working fluid. The material of the container should be non-porous to prevent the diffusion of vapor. A high thermal conductivity ensures minimum temperature drop between the heat source and the membrane 524. As to the working fluid, it has to have an operating vapor temperature range. In the present application, while water is the preferred choice, it is within the terms of the present invention to use other working fluids such as alcohols.

As with the previous embodiments, the capillary structure or membrane 524 is a porous structure made of materials of porous hydrophilic materials including polyethersulfone, other plastics such that are inherently hydrophilic or modified to instill a hydrophilic property having pore sizes as defined before with regard to membrane 224. In addition, membrane 524 has a certain percentage of the pores plugged with fine particles of a conductive material(s). The advantage of the metal particles within the pores is that the membrane has improved electrical conductivity properties. The prime purpose of the membrane 524 is to generate capillary pressure to transport the working fluid from the condenser section 530 to the evaporator section 532 of heat pipe 500.

Inside the container 502 is a liquid, preferably water, under its own pressure, that enters the pores of the membrane 524, wetting all internal surfaces.

Applying heat at any point along the surface of the heat pipe 500, preferably at section 532 causes the liquid at that point to boil and enter a vapor state. When that happens, the liquid picks up the latent heat of vaporization. The gas, which then has a higher pressure, moves inside the sealed container 502 to a colder location in section 530 where it condenses back into a liquid which is absorbed by the membrane and is transformed by capillary action down to section 532 where the process begins again. Thus, the gas gives up the latent heat of vaporization and moves heat from the heat input end 532 to the heat output end 530 of the heat pipe 500.

As shown in FIG. 5A, a heat pipe 500 can be connected to a plurality of stacked fuel cells or electrolysis cells 550.

Another advantage of incorporating the electrically conductive, porous membrane 524 is that it allow heat pipes to be electrically connected to each other as shown in FIG. 5B so that the heat pipes can conduct electricity between fuel cells in a fuel stack or electrolysis cells in an electrolysis stack.

While the invention has been described with respect to a limited number of embodiments, these should not be construed as limitations on the scope of the invention, but rather as exemplifications of some of the embodiments. Those skilled in the art may envision other possible variations, modifications, and implementations that are also within the scope of the invention, based on the disclosure set forth herein.

What is claimed is:

1. A fuel cell, comprising:
   a membrane electrode assembly including a membrane, a hydrogen electrode and an oxygen electrode, a hydrogen compartment disposed on one side of the hydrogen electrode and an oxygen compartment disposed on one side of the oxygen electrode;
   an electrically conductive, porous, hydrophilic membrane having a bubble pressure of about 10 Psid to about 100 Psid being disposed on one side of the oxygen compartment opposite from the oxygen electrode and acting as a gas/liquid separator, the electrically conductive, porous, hydrophilic membrane comprising material selected from a group of polyethersuflone and other plastics in inherently hydrophilic or modified to instill a hydrophilic property wherein the electrically conductive, porous, hydrophilic membrane having a pore size of between about 0.05 micron to 0.5 micron; and
   a low pressure water compartment is disposed on one side of the electrically conductive, porous, hydrophilic membrane opposite from oxygen compartment.

2. The fuel cell of claim 1 wherein:
   the electrically conductive, porous, hydrophilic membrane has a portion of the pores plugged with a conductive material selected from a group consisting of platinum, gold, titanium, nickel, carbon, niobium, stainless steel alloys and other electrically conductive particles; and
   wherein the electrically conductive, porous, hydrophilic membrane has a portion of the pores plugged with a conductive material to the extent that a current density of between about 0 and about 2 amps/cm$^2$ can be conducted through the electrically conductive membrane.

3. An electrolysis cell, comprising:
   a membrane electrode assembly including a membrane and a hydrogen electrode and an oxygen electrode disposed on either side thereof;
   a hydrogen compartment is disposed on one side and adjacent the hydrogen electrode;
   an oxygen compartment is disposed on one side of the oxygen electrode and adjacent the oxygen electrode;
   an electrically conductive, porous, hydrophilic membrane disposed on one side of the oxygen compartment opposite from the side of the oxygen electrode and acting as a gas/liquid separator, the electrically conductive, porous, hydrophilic membrane comprising a material selected from a group consisting of polyethersuflone and other plastics in inherently hydrophilic or modified to instill a hydrophilic property wherein the electrically conductive, porous, hydrophilic membrane having a pore size of between about 0.05 micron to 0.5 micron and a bubble pressure of about 10 Psid to about 100 Psid; and
   a low pressure water compartment is disposed on one side of the electrically conductive, porous, hydrophilic membrane opposite the oxygen compartment.

4. The electrolysis cell of claim 3 wherein the electrically conductive, porous, hydrophilic membrane has a portion of the pores plugged with a conductive material selected from a group consisting of platinum, gold, titanium, nickel, carbon, niobium, stainless steel alloys and other electrically conductive particles to the extent that a current density of between about 0 and about 2 amps/cm² can be conducted through the electrically conductive membrane.

\* \* \* \* \*